United States Patent
Liu (10) Patent No.: US 9,649,944 B2
(45) Date of Patent: May 16, 2017

(54) METHOD OF PROVIDING CONSTANT DRIVING RANGE IN AN ELECTRIC VEHICLE

(71) Applicant: Atieva, Inc., Menlo Park, CA (US)

(72) Inventor: Albert Liu, Palo Alto, CA (US)

(73) Assignee: ATIEVA, INC., Menlo Park, CA (US)

( * ) Notice: Subject to any disclaimer, the term of this patent is extended or adjusted under 35 U.S.C. 154(b) by 65 days.

(21) Appl. No.: 14/691,694

(22) Filed: Apr. 21, 2015

(65) Prior Publication Data
US 2016/0311330 A1      Oct. 27, 2016

(51) Int. Cl.
*B60L 11/18* (2006.01)
*H02J 7/00* (2006.01)

(52) U.S. Cl.
CPC ....... *B60L 11/1809* (2013.01); *B60L 11/1851* (2013.01); *B60L 11/1857* (2013.01); *B60L 11/1861* (2013.01); *B60L 11/1862* (2013.01); *B60L 11/1864* (2013.01); *B60L 11/1877* (2013.01); *H02J 7/0073* (2013.01)

(58) Field of Classification Search
USPC ............... 701/22, 123; 320/128, 132, 134
See application file for complete search history.

(56) References Cited

U.S. PATENT DOCUMENTS

| | | | | |
|---|---|---|---|---|
| 2011/0101778 A1* | 5/2011 | Yang | .................... | H02J 7/0068 307/52 |
| 2011/0153140 A1* | 6/2011 | Datta | .................... | B60R 16/02 701/31.4 |
| 2011/0156641 A1* | 6/2011 | Kishiyama | ............ | H02J 7/0073 320/109 |
| 2012/0143410 A1* | 6/2012 | Gallagher | ........... | B60L 11/1861 701/22 |
| 2014/0379183 A1* | 12/2014 | Long | ..................... | B60W 40/12 701/22 |

(Continued)

FOREIGN PATENT DOCUMENTS

| EP | 2340960 A3 * | 12/2013 | .......... B60L 11/1824 |
|---|---|---|---|
| EP | 003085568 A1 * | 10/2016 | .......... B60L 11/1864 |

(Continued)

OTHER PUBLICATIONS

Conceptional considerations for electrification of public city buses—Energy storage system and charging stations; Philipp Sinhuber; Werner Rohlfs; Dirk Uwe Sauer; Emobility—Electrical Power Train, 2010; Year: 2010; pp. 1-5, DOI: 10.1109/EMOBILITY.2010.5668044.*

(Continued)

*Primary Examiner* — Cuong H Nguyen
(74) *Attorney, Agent, or Firm* — Patent Law Office of David G. Beck (57) ABSTRACT

A method is provided for achieving a constant driving range in an electric vehicle over a multi-year period (e.g., 5, 8, 10 years), where the preset driving range corresponds to a percentage of the driving range that is achievable with the initial battery pack capacity. Prior to each charge cycle, the method first determines the current battery pack capacity and then determines a set of optimized charging parameters based on the current battery pack capacity and the preset driving range. Charging is then performed in accordance with the set of optimized charging parameters.

19 Claims, 8 Drawing Sheets

| Vehicle Age | Battery Pack Capacity (Ah) (Max charge to 100% SOC charge cycles) | Range Based on Available SOC (Max charge to 100% SOC charge cycles) | Battery Pack Capacity (Ah) (Max charge to 94% SOC charge cycles) | Range Based on Available SOC (Max charge to 94% SOC charge cycles) |
|---|---|---|---|---|
| New | 100 | 200 | 100 | 188 |
| 1 years old | 92 | 184 | 95 | 179 |
| 2 years old | 86 | 172 | 90 | 169 |
| 3 years old | 80 | 160 | 85 | 160 |
| 4 years old | 74 | 148 | 81 | 152 |
| 5 years old | 68 | 132 | 76 | 143 |
| 6 years old | 61 | 122 | 72 | 135 |
| 7 years old | 56 | 112 | 66 | 124 |
| 8 years old | 50 | 100 | 63 | 118 |

(56) References Cited

U.S. PATENT DOCUMENTS

| | | | | |
|---|---|---|---|---|
| 2015/0057916 A1* | 2/2015 | Ishii | ............... | G01C 21/3469 701/123 |
| 2015/0287312 A1* | 10/2015 | Mantsvetov | ........... | G08B 21/02 340/906 |
| 2016/0311330 A1* | 10/2016 | Liu | ................. | B60L 11/1864 |

FOREIGN PATENT DOCUMENTS

| | | | | |
|---|---|---|---|---|
| JP | 02008254650 A | * | 10/2008 | ............ B60W 10/06 |
| JP | 2010-058640 | | 3/2010 | |
| JP | 2011-138767 | | 7/2011 | |
| JP | 2015-042049 | | 3/2015 | |
| JP | 2016208812 A | * | 12/2016 | ........... B60L 11/1869 |

OTHER PUBLICATIONS

Battery pack state of charge estimator design using computational intelligence approaches; Jinchun Peng; Yaobin Chen; R. Eberhart; Battery Conference on Applications and Advances, 2000. The Fifteenth Annual; Year: 2000; pp. 173-177, DOI: 10.1109/BCAA.2000.838400.*

Multi-timescale Parametric Electrical Battery Model for Use in Dynamic Electric Vehicle Simulations; Yue Cao; Ryan C. Kroeze; Philip T. Krein; IEEE Transactions on Transportation Electrification; Year: 2016, vol. 2, Issue: 4; pp. 432-442, DOI: 10.1109/TTE.2016.2569069.*

A comparative study of state-of-charge estimation algorithms for lithium-ion batteries in wireless charging electric vehicles; Yong Tian; Dong Li; Jindong Tian; Bizhong Xia; 2016 IEEE PELS Workshop on Emerging Technologies: Wireless Power Transfer (WoW); Year: 2016; pp. 186-190, DOI: 10.1109/WoW.2016.7772089.*

Detection of Utilizable Capacity Deterioration in Battery Systems; Michael A. Roscher; Jochen Assfalg; Oliver S. Bohlen; IEEE Transactions on Vehicular Technology; Year: 2011, vol. 60, Issue: 1; pp. 98-103, DOI: 10.1109/TVT.2010.2090370.*

* cited by examiner

FIG. 8 ional combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.
METHOD OF PROVIDING CONSTANT DRIVING RANGE IN AN ELECTRIC VEHICLE

FIELD OF THE INVENTION

The present invention relates generally to an electric vehicle and, more particularly, to a system and method that achieves a constant driving range in an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at reduced levels compared to conventional vehicles. Additionally, due to the inclusion of both an internal combustion engine and an electric motor(s) with its accompanying battery pack, the drive train of a hybrid vehicle is typically much more complex than that of either a conventional ICE-based vehicle or an all-electric vehicle, resulting in increased cost and weight. Accordingly, several vehicle manufacturers are designing vehicles that only utilize an electric motor, or multiple electric motors, thereby eliminating one source of pollution while significantly reducing drive train complexity.

Figure 1:
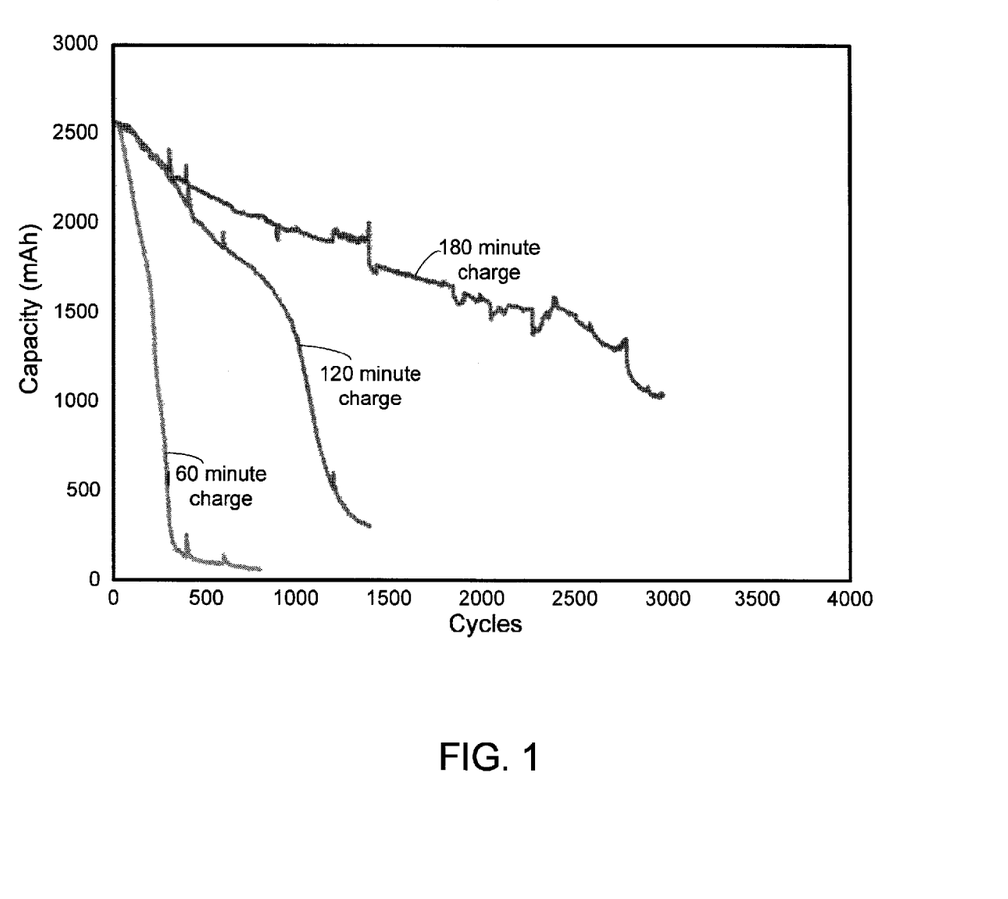
FIG. 1 illustrates the relationship between charge rate and battery lifetime.
Figure 2:
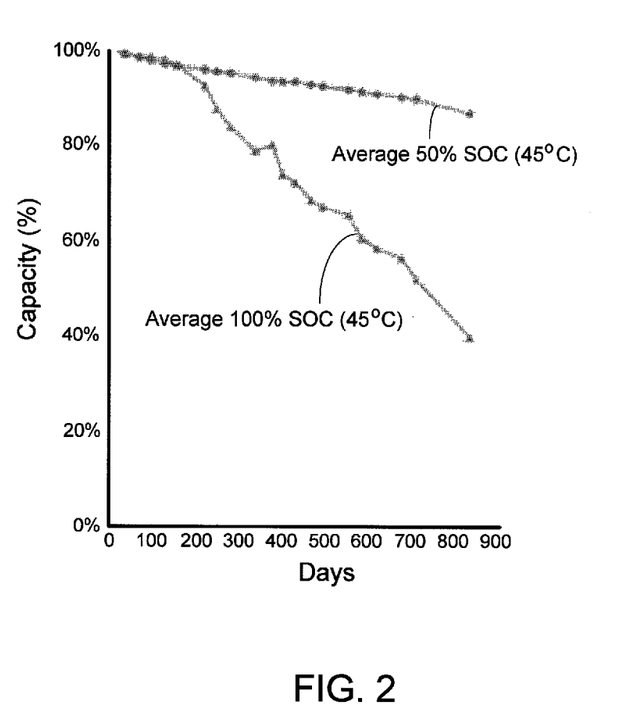
FIG. 2 illustrates the effects of storing a battery at various levels of charge on battery lifetime.

The electric drive trains used in electric vehicles have proven to be highly reliable and capable of providing exceptional performance. Unfortunately car sales for electric vehicles have proven to be lower than one would expect, especially given the performance and reliability of these cars. It appears that these sluggish sales are due, at least in part, to the concerns of many potential buyers regarding the limited driving range when an electric vehicle is new, and the loss of driving range as the car ages. These concerns may be further exacerbated by the relatively complex relationships between battery lifetime and charge rate (illustrated in FIG. 1) and between battery lifetime and the level of charge maintained during storage (illustrated in FIG. 2), relationships that a typical car owner/buyer may have heard of but typically will not fully understand. As a result of not fully understanding the effect that charge rate and state-of-charge (SOC) have on battery life, even if a vehicle permits the driver to set charging parameters, a typical car owner finds it difficult to optimize these parameters. Accordingly, what is needed is a system that provides the user with a relatively constant driving range for a given vehicle lifetime, thus eliminating the fears associated with range loss as the car ages, and one which does not require the user to set and/or monitor charging parameters in order to maintain this driving range. The present invention provides such a system.

SUMMARY OF THE INVENTION

The present invention provides a method of providing a constant driving range over a multi-year period for an electric vehicle, where the battery pack coupled to the vehicle's electric drive train has an initial battery pack capacity at the beginning of the multi-year period and a final battery pack capacity at the end of the multi-year period, and where the final battery pack capacity is less than the initial battery pack capacity, the method including the step of setting a preset driving range at the beginning of the multi-year period, where the preset driving range corresponds to a percentage of the driving range that is achievable with the initial battery pack capacity, and where the preset driving range is based on a preset set of driving conditions. Prior to each charge cycle the method includes the steps (i) determining a current battery pack capacity, and (ii) determining a set of optimized charging parameters based on the current battery pack capacity and the preset driving range, where the set of optimized charging parameters are selected to optimize battery life while providing sufficient charge to the battery pack to insure that the electric vehicle is capable of achieving the preset driving range under the preset set of driving conditions. The method further includes the step of charging the battery pack in accordance with the set of optimized charging parameters.

In one aspect, the initial battery pack capacity may correspond to the initial battery pack energy capacity; the final battery pack capacity may correspond to the final battery pack energy capacity; and the current battery pack capacity may correspond to the current battery pack energy capacity.

In another aspect, prior to each charge cycle the method may include the steps of (i) determining current battery pack temperature, (ii) determining current ambient temperature, and (iii) determining the set of optimized charging parameters based on current battery pack capacity, preset driving range, current battery pack temperature and current ambient temperature.

In another aspect, prior to each charge cycle the method may include the steps of (i) determining current vehicle elevation, and (ii) determining the set of optimized charging parameters based on current battery pack capacity, preset driving range and vehicle elevation.

In another aspect, prior to each charge cycle the method may include the steps of (i) determining current battery pack temperature, (ii) determining current ambient temperature, (iii) determining current vehicle elevation, and (iii) determining the set of optimized charging parameters based on current battery pack capacity, preset driving range, current battery pack temperature, current ambient temperature and vehicle elevation.

In another aspect, the step of determining the set of optimized charging parameters may further include the step of selecting the set of optimized charging parameters in order to minimize battery pack state-of-charge (SOC) during the charging step while still providing a sufficient charge to the battery pack to insure the electric vehicle is capable of achieving the preset driving range under the preset set of driving conditions.

In another aspect, the step of charging the battery pack may be performed immediately after completion of the step of determining the set of optimized charging parameters; alternately, the step of charging the battery pack may be delayed after completion of the step of determining the set of optimized charging parameters.

In another aspect, the steps of determining the current battery pack capacity and determining the set of optimized charging parameters may be performed when the battery pack is electrically connected to a charging power source; alternately, performed at a preset time of day each day; alternately, performed when the electric vehicle is located at a preset location.

In another aspect, the step of determining the current battery pack capacity may include the step of performing a self-test calibration procedure. The self-test calibration procedure may be performed periodically based on the completion of a preset number of charge cycles between consecutive self-test calibration procedures.

In another aspect, the step of determining the current battery pack capacity may include the steps of monitoring a set of battery pack characteristics and estimating the current battery pack capacity based on the set of battery pack characteristics.

In another aspect, the preset driving range may be set to correspond to a battery capacity of less than 80% of the initial battery pack capacity; alternately, less than 70% of the initial battery pack capacity.

In another aspect, the multi-year period may be set to correspond to at least a 5 year period; alternately, to at least an 8 year period; alternately, to at least a 10 year period.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably.

It is well known that the performance of rechargeable batteries decreases over time, where performance is typically provided in terms of either capacity (Ah) or energy capacity (kWh). There are a number of factors that contribute to this aging effect, factors which can generally be divided into four groups: chemistry, form factor, use, and environmental. The chemistry of the battery (e.g., nickel-metal hydride versus lithium ion versus lithium ion polymer, etc.) as well as the form factor of the battery (e.g., prismatic versus cylindrical, etc.) determines the expected performance of a battery, where performance is generally given in terms of power density, charging characteristics, cycle life, nominal cell voltage, overcharging tolerance, cell voltage, load current, self-discharge rates, and operating temperature range. Battery use takes into account the age of the battery, the number of charge/discharge cycles, the depth of discharge per cycle, the charging level per charging cycle (i.e., percentage of capacity), and the charging rate/charging voltage used per charging cycle. Environmental conditions include storage temperature, temperature during use, and the temperature during charging.

In a typical system that utilizes rechargeable batteries, regardless of whether the system is a wireless power tool or an EV, battery degradation over time is both known and expected. While the consequences of battery degradation may be minor in many applications such as a wireless power tool where battery degradation simply leads to less usage time between charging cycles, the consequences in an EV are quite significant as the result of battery degradation is reduced driving range. Therefore an EV that may have an adequate driving range for a user's typical daily commute when new, may prove woefully inadequate after just a few years of use. Given that a typical EV buyer may not fully appreciate the consequences of battery aging on an EV's driving range, much less understand the consequences of depth of discharge, charging level, charging rate, temperature, etc. on battery degradation, it is quite common for an EV owner to become confused, frustrated, and eventually dissatisfied with their EV's performance. In turn this dissatisfaction leads to bad publicity and lost sales, both in terms of new sales and repeat buyers. In order to overcome these issues, the present invention provides the user with an EV that has a given driving range when new and one that does not degrade over time, at least over the nominal life expectancy of the car where the nominal life expectancy is typically set at 5, 8 or 10 years, depending primarily upon the market. As a result, an EV owner no longer must worry about whether or not their EV will continue to meet their needs as the car ages, or be concerned with how to optimize battery charging.

Figure 3:
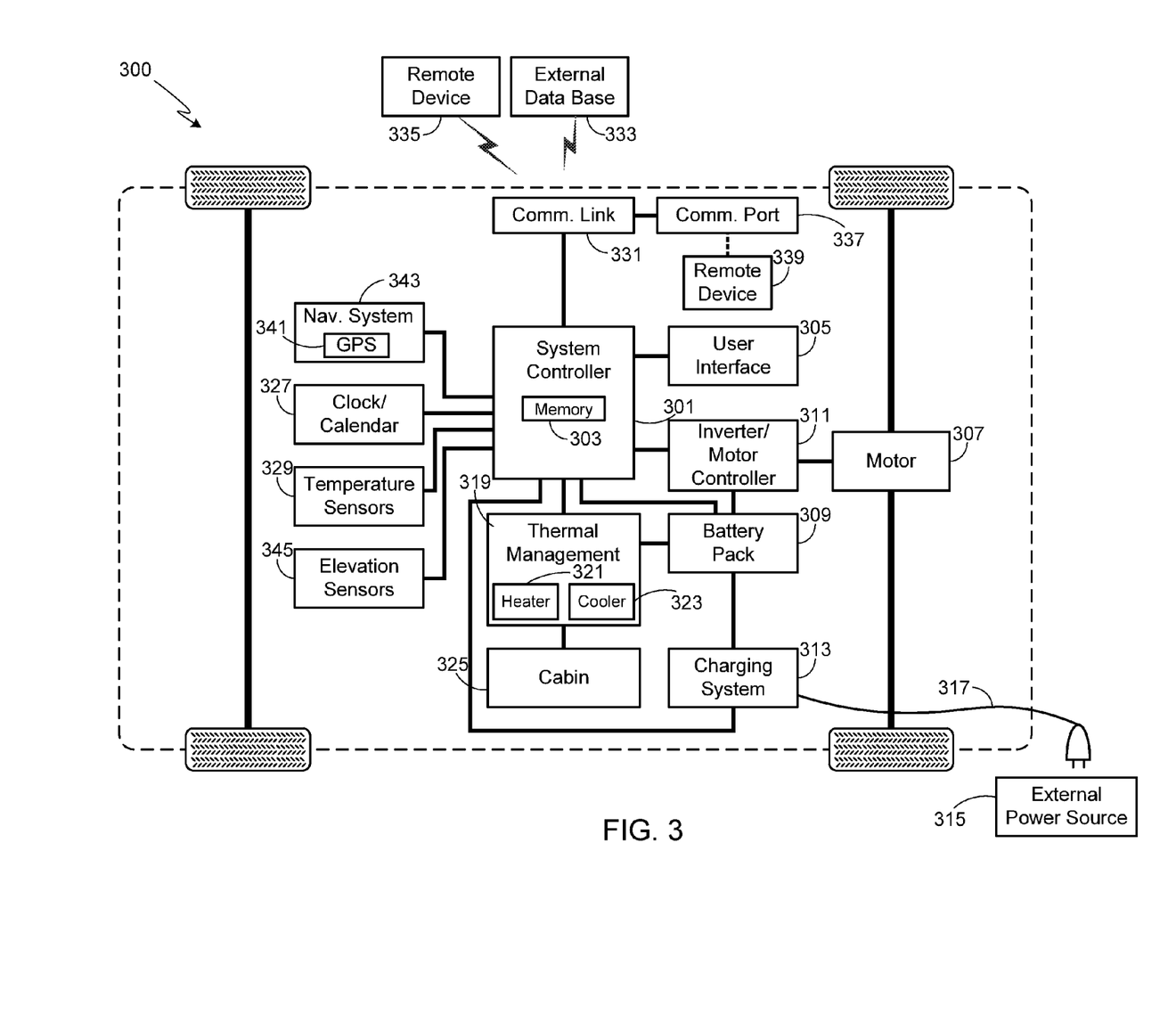
FIG. 3 provides a system level diagram of the primary EV systems utilized in at least one embodiment of the invention.

FIG. 3 is a high-level view of an EV 300 and the primary systems used in a driving range control system used in accordance with the invention. It should be understood that the system configuration illustrated in FIG. 3 is but one possible configuration and that other configurations may be used while still retaining the functionality of the invention. Additionally, one or more of the elements shown in FIG. 3 can be grouped together in a single device, and/or circuit board, and/or integrated circuit.

Vehicle 300 includes a vehicle system controller 301, also referred to herein as a vehicle management system, which is comprised of a central processing unit (CPU). System controller 301 also includes memory 303, with memory 303 being comprised of EPROM, EEPROM, flash memory, RAM, solid state drive, hard disk drive, or any other type of memory or combination of memory types. A user interface 305 is coupled to vehicle management system 301. Interface 305 allows the driver, or a passenger, to interact with the vehicle management system, for example inputting data into the navigation system, altering the heating, ventilation and air conditioning (HVAC) system, controlling the vehicle's entertainment system (e.g., radio, CD/DVD player, etc.), adjusting vehicle settings (e.g., seat positions, light controls, etc.), and/or otherwise altering the functionality of vehicle 300. In at least some embodiments, interface 305 also includes means for the vehicle management system to provide information to the driver and/or passenger, information such as a navigation map or driving instructions as well as the operating performance of any of a variety of vehicle systems (e.g., battery pack charge level, selected gear, current entertainment system settings such as volume level and selected track information, external light settings, current vehicle speed, current HVAC settings such as cabin temperature and/or fan settings, etc.). Interface 305 may also be used to warn the driver of a vehicle condition (e.g., low battery charge level) and/or communicate an operating system malfunction (battery system not charging properly, charging cable not connected properly, low tire air pressure, malfunctioning light, etc.). Interface 305 may be comprised of a single interface, for example a touch-screen display, or a combination of user interfaces such as push-button switches, capacitive switches, slide or toggle switches, gauges, display screens, visible and/or audible warning indicators, etc. It will be appreciated that if user interface 305 includes a graphical display, controller 301 may also include a graphical processing unit (GPU), with the GPU being either separate from or contained on the same chip set as the CPU.

Vehicle 300 includes a propulsion source 307 that is comprised of one or more motors. The vehicle's propulsion source 307 may be mechanically coupled to the front axle/wheels, the rear axle/wheels, or both, and may utilize any of a variety of transmission types (e.g., single speed, multi-speed) and differential types (e.g., open, locked, limited slip).

Energy is supplied to the motor(s) in source 307 by a battery pack 309. Battery pack 309, which may be comprised of one or hundreds or thousands of rechargeable batteries, is preferably also used to supply the energy necessary for the various vehicle systems that require electrical power (e.g., lights, entertainment systems, navigation system, etc.). Typically battery pack 309 is coupled to the motor(s) 307 via a power control system 311 (i.e., an inverter and motor controller) that insures that the energy delivered to the drive motor is of the proper form (e.g., correct voltage, current, waveform, etc.).

Battery pack 309 is charged by a charging system 313. Preferably charging system 313 is integrated into vehicle 300 as shown, although an external charging system may also be used with vehicle 300. Charging system 313 is configured to be electrically connected to an external source 315, such as a municipal power grid, typically by using a power cord 317. In at least one configuration, charging system 313 is wirelessly connected to external source 315, for example using an inductive charging pad over which vehicle 300 is parked. Battery pack 309 may also be charged, at least in part, using an on-board charging system such as a regenerative braking system.

Vehicle 300 includes a thermal management system 319 that includes both a heating subsystem 321 and a cooling subsystem 323. Thermal management system 319 may be used to maintain the passenger cabin 325 within the desired temperature range as well as to insure that the batteries within battery pack 309 are maintained within the batteries' desired operating, charging and/or storage temperature ranges. When system 319 is used to control the temperature of battery pack 309, the system may utilize heated or cooled air, circulating the heated or cooled air throughout the battery pack; alternately, a coolant circulation system may be thermally coupled to the battery pack, where the coolant is heated by heater 321 or cooled by cooler 323 as required.

Vehicle system controller 301 may also monitor a variety of other conditions and subsystems, using the data obtained to set the charging parameters for battery pack 309 as described in detail below. For example, the system monitors the length of time that the battery pack has been in use with a clock/calendar subsystem 327, thereby allowing controller to adjust battery conditions based on system age. It will be appreciated that while the clock/calendar subsystem 327 is shown as a separate subsystem, typically this function is embedded in system controller 301. The system is also coupled to a variety of temperature sensors 329. At a minimum, sensors 329 monitor battery temperature, where battery temperature may be based on individually monitored battery temperature or based on an average temperature corresponding to the batteries within the battery pack. Battery temperature may be monitored at the individual battery level; alternately, battery temperature may be monitored for a group of batteries, for example batteries mounted within the pack in close proximity to one another; alternately, battery temperature may be based on the temperature of the thermal transfer fluid (e.g., coolant) used by thermal management system 319 to control battery pack temperature; alternately, battery temperature may be based on the temperature of the air exiting the battery pack. It should be understood that other techniques may be used to monitor battery/battery pack temperature and the invention is not limited to a specific technique.

In a typical vehicle configuration, coupled to vehicle management system 301 is a communication link 331. Communication link 331 may be used to wirelessly obtain configuration updates from an external data source (e.g., manufacturer, dealer, service center, web-based application, remote home-based system, third party source, etc.) or access an external data base 333, for example a data base maintained by the car's manufacturer or other third party.

Communication link 331 may also be used to provide a communication link between the system controller 101 and a user device or system 335, for example the user's smartphone, tablet, personal digital assistant (PDA), home computer, work computer, network-based computing system, etc. Link 331 may use any of a variety of different technologies (e.g., GSM, EDGE, UMTS, CDMA, DECT, WiFi, WiMax, etc.).

In some embodiments, communication link 331 may also include an on-board port 337, such as a USB, Thunderbolt, or other port. Port 337 allows communication between a system controller 301 and a user device or system 339 (e.g., smartphone, tablet, personal digital assistant (PDA), home computer, work computer, network-based computing system, etc.) over a wired communication link.

Typically vehicle 300 also includes a global positioning system (GPS) 341, thereby allowing the position of the vehicle to be determined. GPS 341 may be a stand-alone system or, as preferred, integrated into a navigation system 343. Vehicle system controller 301 may also be coupled to one or more elevation sensors 345 that monitor the car's elevation relative to sea level as well as changes in elevation.

Figure 4:
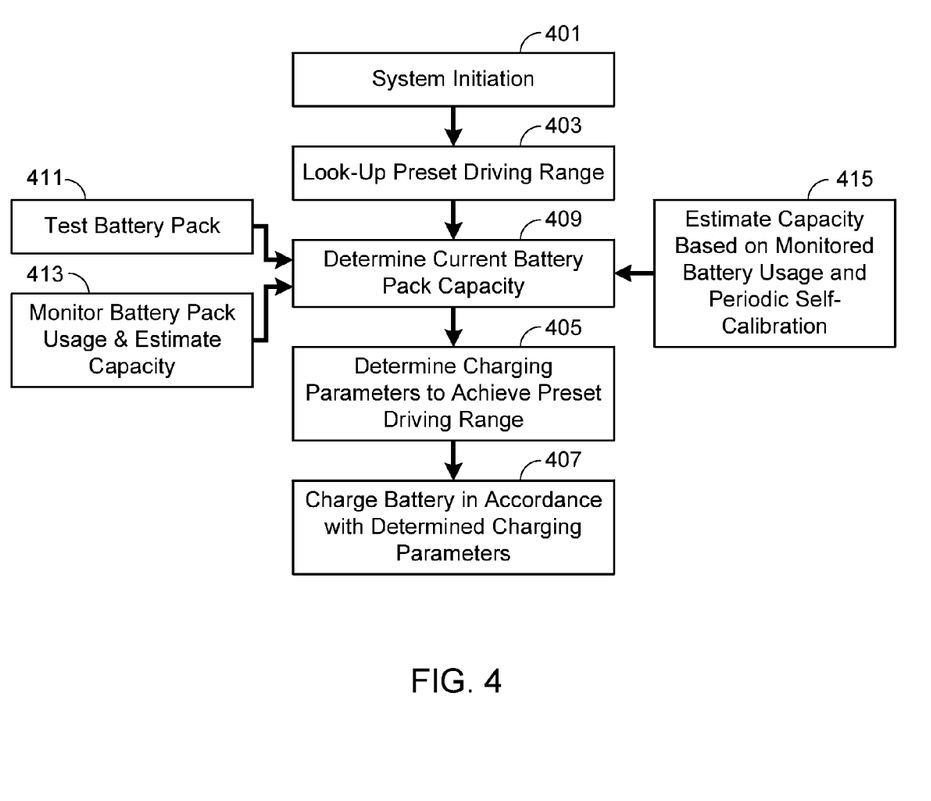
FIG. 4 illustrates the basic methodology of the invention.

FIG. 4 illustrates the basic methodology of the invention. The first step is system initiation (step 401). In at least one embodiment, system initiation occurs when charging system 313 is plugged into power source 315. The process of the invention may also be set-up to occur in the background, for example whenever the car is running, so that the charging parameters are already determined when the system is plugged into the charging source 315. In at least one embodiment, the process is initiated at a preset time, for example when the system controller is performing a daily maintenance routine (e.g., checking for software updates using communication link 331). The process may also be initiated when the car is located at a preset location, as determined by GPS 341, such as the user's home.

Once the process is initiated (step 401), the system looks up the preset driving range (step 403), which is preferably stored in memory 303. The preset driving range is set at a value that is less, and that is potentially significantly less, than the vehicle is capable of achieving when battery pack 309 is new. For example, the preset driving range may be based on 90%, 80%, 70% or less of the capacity of battery pack 309 when new.

The next step of the process is to determine the appropriate charging parameters given the current capacity of the battery pack (step 405). The charging parameters are selected to optimize battery life, typically by minimizing the charging voltage, while still insuring a sufficient state-of-charge (SOC) to provide the preset driving range. Once the appropriate charging parameters have been determined (step 405), battery pack 309 is charged in accordance with those charging parameters (step 407). Although typically charging is performed immediately, in at least one embodiment charging is delayed, for example delayed until the next time that the EV is parked at the EV's primary charging station (e.g., home).

In order to determine the appropriate charging parameters in step 405, the system must first determine the current capacity of battery pack 309 (step 409). In one embodiment, the battery pack is periodically tested using a self-test calibration procedure (step 411). Although self-testing can be performed in a variety of ways, in one configuration the system enters into a self-testing mode when the car is plugged into a charging source and after determining that the car will not be required for a sufficient period of time to allow the testing procedure to be completed. The system controller 301 may query the driver, for example using interface 305, to determine an appropriate time to perform the test (e.g., during the night). Preferably self-testing is performed on a schedule, for example once per given time period (e.g., once per month) or once per given number of charging cycles (e.g., once every 45 charge cycles). Self-testing can be performed in a variety of ways, for example by monitoring battery performance while fully charging the battery pack, then discharging the pack to a preset level (typically to a low battery' level), and then recharging the battery pack.

In another embodiment, the current capacity of the battery pack is determined by monitoring day-to-day use of the pack and then estimating battery pack capacity based on monitored use (step 413). Preferably the depth of discharge per cycle, the number of charge/discharge cycles to date, the age of the battery pack, charging level/voltage per cycle, temperature during use, and storage temperature are all monitored and used to estimate current capabilities. In this configuration, preferably stored within memory 303 is a matrix of battery pack capacity for battery pack 309 under various conditions, thus allowing controller 301 to determine the current capacity based on the use to date.

In yet another embodiment, in addition to monitoring the day-to-day use of the battery pack as described above relative to step 413, the battery pack is periodically calibrated using a self-testing procedure, for example as described above. (Step 415). Periodic calibration allows system controller 301 to make periodic corrections to the estimation procedure that is based on monitored battery use, thereby achieving a more accurate representation of the battery pack's current capacity while minimizing the need for self-calibration.

As described above, during step 405 the system determines the optimum charging level, typically the lowest SOC level, to which the battery pack can be charged while still providing sufficient charge to achieve the preset driving range. Therefore throughout the nominal life of the car (e.g., the warranty period for the vehicle), as the battery ages and its capabilities decrease the system automatically varies the charging parameters in order to maintain the same driving range as when the car was new. This holds true regardless of the reason for the battery pack's decreasing capacity (e.g., simple aging, storing at high temperature at a high SOC, repeated fast charging, repeated use to a high depth of discharge prior to charging, etc.).

Figure 5:
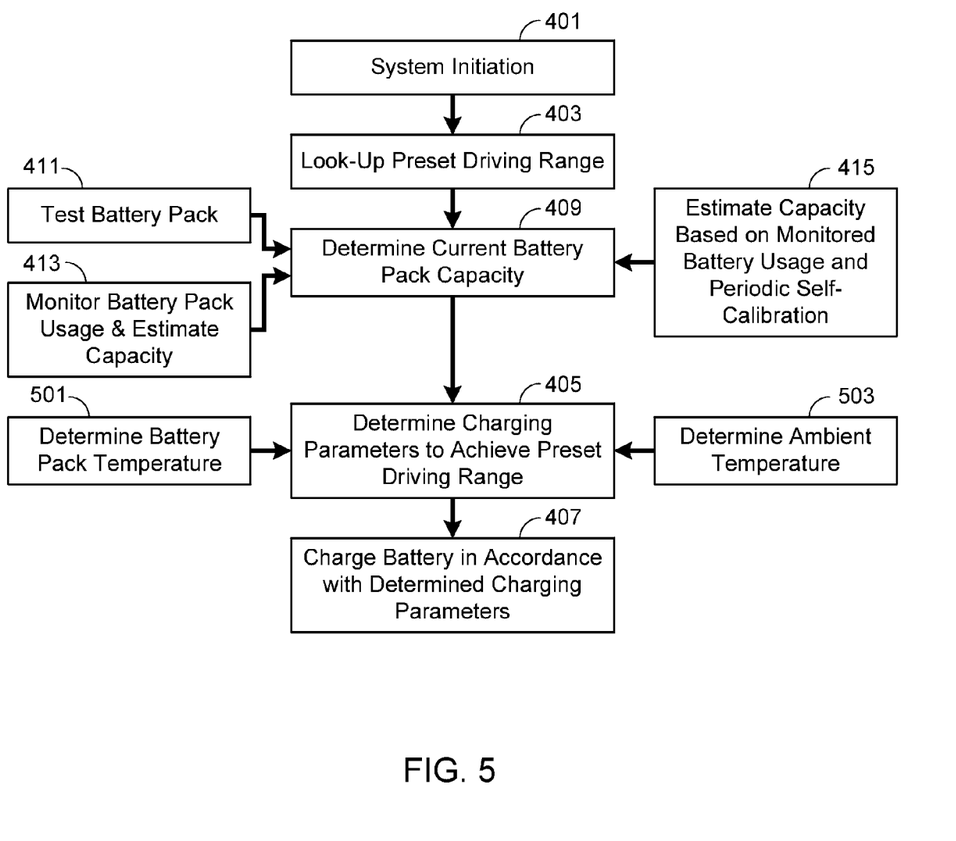
FIG. 5 illustrates a modification of the methodology shown in FIG. 4.

In a modification of the process described above, and as illustrated in FIG. 5, the system also monitors current battery temperature (step 501) and current ambient temperature (step 503). Then during step 405 these temperatures are taken into account in addition to the current battery pack capabilities and the preset driving range when determining the appropriate charging parameters (e.g., optimal charge level).

Figure 6:
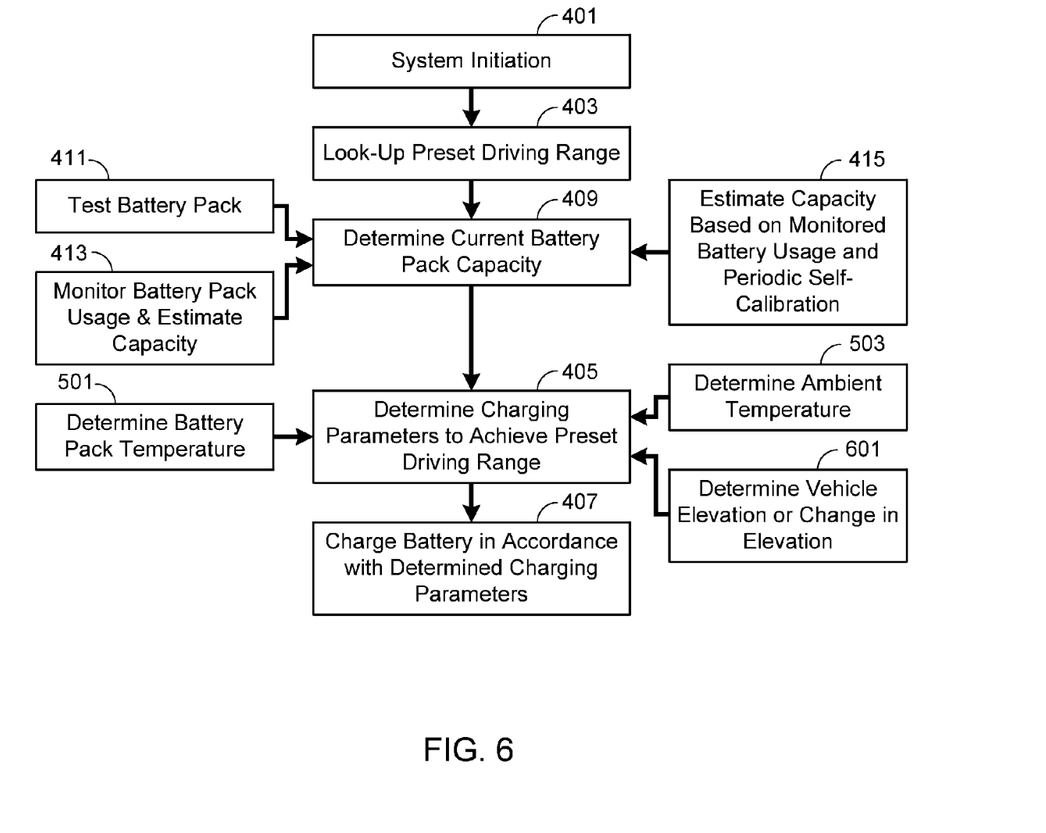
FIG. 6 illustrates a modification of the methodology shown in FIG. 5.

In yet another modification of the process described above, and as illustrated in FIG. 6, the system also monitors vehicle elevation (step 601). Then when determining the appropriate charging parameters during step 405, the vehicle elevation is taken into account along with the current battery pack capacity and the preset driving range. In this configuration, preferably the temperatures determined in steps 501/503 are also taken into account as shown.

It should be understood that the preset driving range, and the capabilities of the system to set charging parameters to insure that this driving range remains constant throughout the given life expectancy of the car (e.g., the warranty period), assumes that the car is driven under a preset set of conditions that are deemed 'normal' driving. Preferably the preset set of conditions are those used by the EPA (Environmental Protection Agency) or a similar agency to rate the mileage of an electric vehicle. Therefore just as fuel economy for a conventional ICE-based vehicle is based on a set of assumptions and conditions, and the user's actual mileage may vary depending upon how they drive the car, whether a driver achieves or exceeds the preset driving range using the present invention depends on how closely the driving conditions mirror the test assumptions and conditions.

Figure 7:
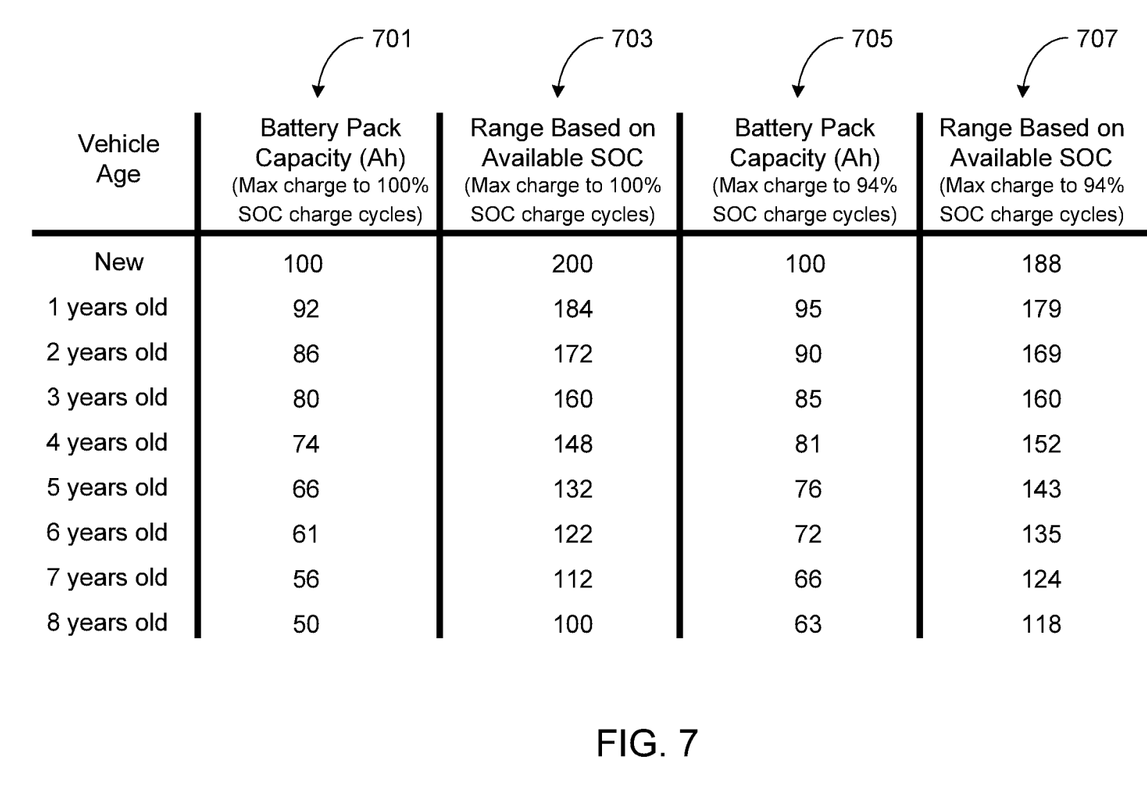
FIG. 7 illustrates the relationships between battery pack capacity and driving range in a conventional system.
Figure 8:
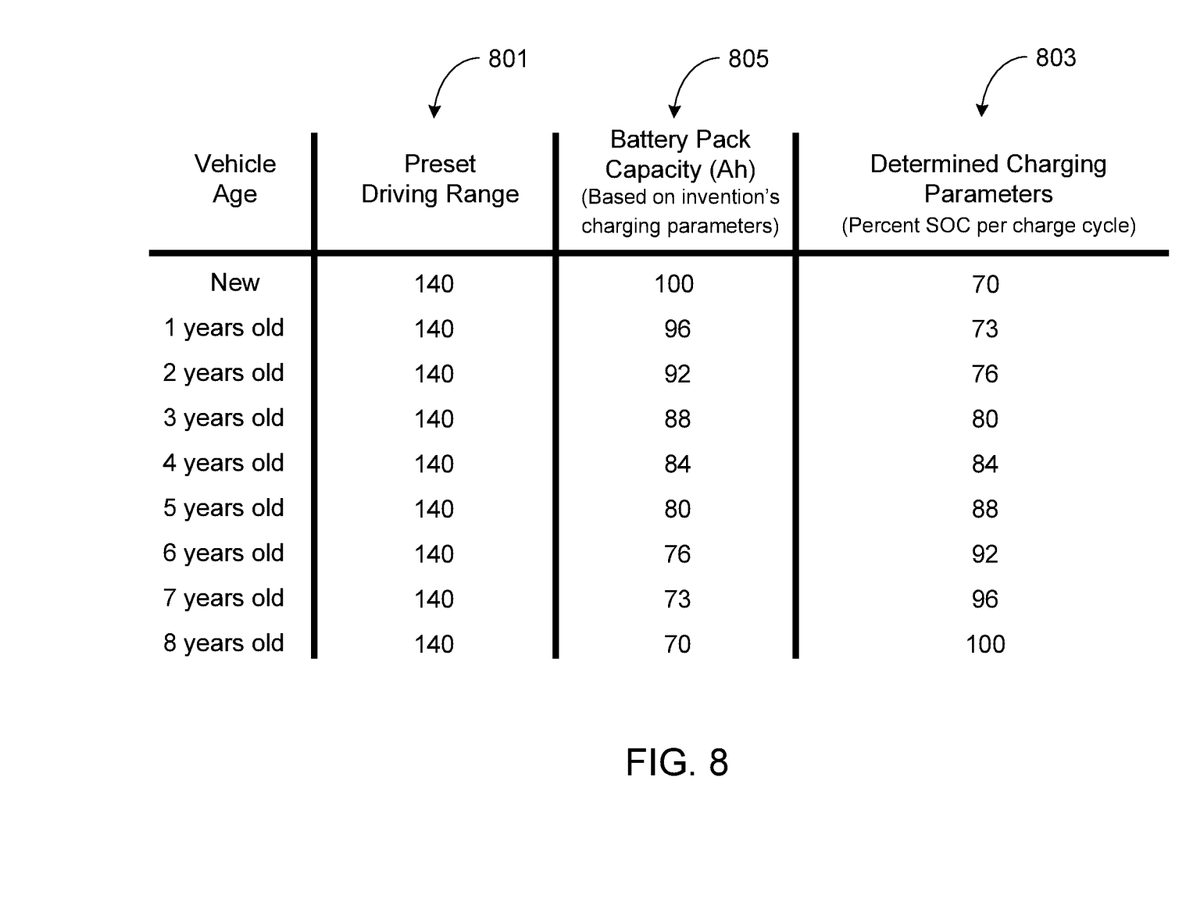
FIG. 8 illustrates the relationships between battery pack capacity and driving range in an exemplary system used in accordance with the invention.

FIGS. 7 and 8 illustrate the relationships between battery pack performance and life for a battery pack used in a conventional system (FIG. 7) and one operated in accordance with the invention (FIG. 8), thereby illustrating the advantages and benefits of the present invention. The data provided in these figures is illustrative of general performance trends for the given parameters and should not be construed as representing actual data acquired through experimentation.

In FIG. 7, column 701 represents the battery pack capacity for a particular EV battery pack through the first eight years of use, where capacity is given in terms of a percentage of the battery pack's capacity when new (Ah) or energy capacity when new (kWh). For this example, when the battery pack is new the driving range for the vehicle is 200 miles. The relatively rapid decline in performance indicated in column 701 is due to battery misuse. Although battery misuse may result from a variety of conditions such as repeated deep discharges, high charge rates or discharge rates, battery storage at high SOC and high temperatures, etc., for this particular example it is assumed that the battery misuse is the result of charging the battery pack to a 100% SOC per charge cycle. The effects of this charging regimen is a rapid decrease in battery pack performance as indicated in battery pack capacity (column 701) and similarly in the corresponding driving range (column 703). Columns 705 and 707 represent the same relationship when the battery pack is charged to a lower SOC per charge cycle, specifically charging to 94% SOC per charge cycle. Thus when the battery pack is new and is only charged to 94% capacity, it is capable of delivering a 188 mile driving range (i.e., a 6% decrease from that provided by charging to 100% SOC). However, due to the less strenuous charging regimen, battery life and performance are improved over the 8 year period of this example. Therefore even though the charging regimen used in the second example provides a decreased driving range initially, over a relatively short period of time (e.g., within 3 years) the driving range of the EV in the second example surpasses that of the EV in the first example.

While it is possible to design a battery system for use in an EV that minimizes battery degradation over time, for example by carefully managing the depth of discharge per use cycle, charging voltage per charging cycle, operating and storage temperatures, etc., the battery pack will still degrade over time, leading to a decrease in driving range. The present invention, however, masks this degradation by presetting the driving range to a lower value then is initially possible when the battery pack is new. In FIG. 8, the driving range for the same battery pack as used in the prior example is preset to 140 miles (column 801). Accordingly when the battery pack is new and capable of delivering a 200 mile range at full capacity, the system is only charging to 70% capacity (see column 803). As a result of charging the pack to a much lower level than in the prior examples, battery life is significantly increased. While battery life may be extended by charging to a lower SOC, battery degradation still occurs as shown in the battery pack's decrease in capacity (column 805). However, throughout the entire 8 year life of the EV in question, the preset driving range never decreases. Furthermore, at end-of-life the EV system using the present invention actually has a greater driving range than achieved in the conventional approach. Accordingly, the vehicle's owner is never frustrated by decreased driving range or confused by questions relating to appropriate charging practices. It will be appreciated that even if the owner subjects their vehicle to a limited period of battery misuse, for example by repeatedly using fast charging cycles during a cross-country trip, thereby affecting the battery's capacity, the system of the invention simply varies the charging parameters appropriately to insure the same preset driving range.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of providing a constant driving range over a multi-year period for an electric vehicle, wherein said electric vehicle is comprised of a battery pack coupled to an electric drive train, wherein said battery pack has an initial battery pack capacity at a beginning of said multi-year period and a final battery pack capacity at an end of said multi-year period, and wherein said final battery pack capacity is less than said initial battery pack capacity, the method comprising:

setting a preset driving range at said beginning of said multi-year period, wherein said preset driving range corresponds to a percentage of an achievable driving range based on said initial battery pack capacity, wherein said percentage is less than 100 percent of said initial battery pack capacity and wherein said preset driving range is based on a preset set of driving conditions; and prior to each charge cycle during said multi-year period, the method comprising:

determining a current battery pack capacity; and determining a set of optimized charging parameters based on said current battery pack capacity and said preset driving range, wherein said set of optimized charging parameters are selected to optimize battery life while providing sufficient charge to said battery pack to insure said electric vehicle is capable of achieving said preset driving range under said preset set of driving conditions; and charging said battery pack in accordance with said set of optimized charging parameters.

2. The method of claim 1, wherein said initial battery pack capacity corresponds to an initial battery pack energy capacity, wherein said final battery pack capacity corresponds to a final battery pack energy capacity, and wherein said current battery pack capacity corresponds to a current battery pack energy capacity.

3. The method of claim 1, wherein prior to each charge cycle during said multi-year period the method further comprises determining a current battery pack temperature and a current ambient temperature, and wherein said step of determining said set of optimized charging parameters further comprises determining said set of optimized charging parameters based on said current battery pack capacity, said preset driving range, said current battery pack temperature and said current ambient temperature.

4. The method of claim 1, wherein prior to each charge cycle during said multi-year period the method further comprises determining a current vehicle elevation, and wherein said step of determining said set of optimized charging parameters further comprises determining said set of optimized charging parameters based on said current battery pack capacity, said preset driving range and said current vehicle elevation.

5. The method of claim 1, wherein prior to each charge cycle during said multi-year period the method further comprises determining a current battery pack temperature and a current ambient temperature and a current vehicle elevation, and wherein said step of determining said set of optimized charging parameters further comprises determining said set of optimized charging parameters based on said current battery pack capacity, said preset driving range, said current battery pack temperature, said current ambient temperature and said current vehicle elevation.

6. The method of claim 1, wherein said step of determining said set of optimized charging parameters further comprise selecting said set of optimized charging parameters to minimize battery pack state-of-charge (SOC) during said charging step while providing a sufficient charge to said battery pack to insure said electric vehicle is capable of achieving said preset driving range under said preset set of driving conditions.

7. The method of claim 1, wherein said step of charging said battery pack is performed immediately after completion of said step of determining said set of optimized charging parameters.

8. The method of claim 1, wherein said step of charging said battery pack is delayed after completion of said step of determining said set of optimized charging parameters.

9. The method of claim 1, wherein said steps of determining said current battery pack capacity and determining said set of optimized charging parameters are performed when said battery pack is electrically connected to a charging power source.

10. The method of claim 1, wherein said steps of determining said current battery pack capacity and determining said set of optimized charging parameters are performed at a preset time of day each day.

11. The method of claim 1, wherein said steps of determining said current battery pack capacity and determining said set of optimized charging parameters are performed when said electric vehicle is located at a preset location.

12. The method of claim 1, wherein said step of determining said current battery pack capacity further comprises performing a self-test calibration procedure.

13. The method of claim 12, wherein said step of determining said current battery pack capacity further comprises monitoring each occurrence of a charge cycle, wherein said step of performing said self-test calibration procedure is performed periodically based on completion of a preset number of charge cycles between consecutive self-test calibration procedures.

14. The method of claim 1, wherein said step of determining said current battery pack capacity further comprises monitoring a set of battery pack characteristics and estimating said current battery pack capacity based on said set of battery pack characteristics.

15. The method of claim 1, wherein said preset driving range corresponds to a battery pack capacity of less than 80% of said initial battery pack capacity.

16. The method of claim 15, wherein said preset driving range corresponds to a battery pack capacity of less than 70% of said initial battery pack capacity.

17. The method of claim 1, wherein said multi-year period corresponds to at least a 5 year period.

18. The method of claim 17, wherein said multi-year period corresponds to at least an 8 year period.

19. The method of claim 18, wherein said multi-year period corresponds to at least a 10 year period.

* * * * *